United States Patent
Kikuchi

(10) Patent No.: US 12,500,034 B2
(45) Date of Patent: Dec. 16, 2025

(54) MULTILAYER CERAMIC CAPACITOR WITH INTERNAL ELECTRODES HAVING NARROWED PORTION AND METHOD OF MANUFACTURING THE SAME

(71) Applicant: TAIYO YUDEN CO., LTD., Tokyo (JP)

(72) Inventor: Hitoshi Kikuchi, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 136 days.

(21) Appl. No.: 18/166,811

(22) Filed: Feb. 9, 2023

(65) Prior Publication Data

US 2023/0268123 A1 Aug. 24, 2023

(30) Foreign Application Priority Data

Feb. 22, 2022 (JP) .............................. 2022-025207

(51) Int. Cl.
 *H01G 4/012* (2006.01)
 *H01G 4/30* (2006.01)

(52) U.S. Cl.
 CPC .............. *H01G 4/012* (2013.01); *H01G 4/30* (2013.01)

(58) Field of Classification Search
 CPC .................................. H01G 4/30; H01G 4/012
 See application file for complete search history.

(56) References Cited

U.S. PATENT DOCUMENTS

| | | | |
|---|---|---|---|
| 6,104,599 A | 8/2000 | Ahiko et al. | |
| 2002/0070442 A1* | 6/2002 | Ahiko | H01G 4/232 257/703 |
| 2011/0273815 A1* | 11/2011 | Kobayashi | H01G 4/232 361/306.3 |
| 2012/0234462 A1 | 9/2012 | Matsui et al. | |

(Continued)

FOREIGN PATENT DOCUMENTS

| | | | | |
|---|---|---|---|---|
| DE | 102013102686 A1 * | 9/2014 | ............. | H01C 1/146 |
| JP | 09050935 A * | 2/1997 | | |

(Continued)

OTHER PUBLICATIONS

Japanese Office Action dated Aug. 26, 2025 in a counterpart Japanese patent application No. 2022-025207. (A machine translation (not reviewed for accuracy) attached.).

*Primary Examiner* — David M Sinclair
(74) *Attorney, Agent, or Firm* — CHEN YOSHIMURA LLP

(57) ABSTRACT

A multilayer ceramic capacitor includes a ceramic body including a multilayer body and a pair of side margin portions, the multilayer body including ceramic layers stacked in a direction of a first axis, internal electrodes interposed between the ceramic layers, a pair of end surfaces perpendicular to a second axis orthogonal to the first axis, and a pair of side surfaces perpendicular to a third axis orthogonal to the first axis and the second axis, the pair of side margin portions covering the pair of side surfaces, and a pair of external electrodes covering the pair of end surfaces, respectively, wherein each of the internal electrodes includes a lead-out portion led out to either one of the pair of end surfaces of the multilayer body and a narrow-width portion having a width in a direction of the third axis smaller than that of the lead-out portion.

5 Claims, 19 Drawing Sheets

(56) References Cited

U.S. PATENT DOCUMENTS

| | | | |
|---|---|---|---|
| 2014/0230210 A1* | 8/2014 | Bultitude | H01G 4/232 29/25.42 |
| 2014/0345926 A1 | 11/2014 | Lee et al. | |
| 2016/0049245 A1* | 2/2016 | Kitano | H01G 4/38 361/301.4 |
| 2016/0126013 A1* | 5/2016 | Park | H01G 4/232 361/301.4 |
| 2017/0162322 A1 | 6/2017 | Park et al. | |
| 2019/0189352 A1* | 6/2019 | Yamato | H01G 4/30 |
| 2019/0304697 A1 | 10/2019 | Nakamura et al. | |
| 2022/0148803 A1* | 5/2022 | Kim | H01G 4/30 |
| 2022/0406525 A1* | 12/2022 | Izumi | H01G 4/012 |

FOREIGN PATENT DOCUMENTS

| | | | | |
|---|---|---|---|---|
| JP | 10064703 A | * | 3/1998 | |
| JP | H10-261544 A | | 9/1998 | |
| JP | 2004228514 A | * | 8/2004 | H01G 4/012 |
| JP | 2005251940 A | * | 9/2005 | |
| JP | 2005259772 A | * | 9/2005 | |
| JP | 2012-209539 A | | 10/2012 | |
| JP | 2014-229892 A | | 12/2014 | |
| JP | 2016015461 A | * | 1/2016 | |
| JP | 2019-176127 A | | 10/2019 | |
| JP | 2021518993 A | * | 8/2021 | |
| WO | 2008/047566 A1 | | 4/2008 | |

* cited by examiner

MULTILAYER CERAMIC CAPACITOR WITH INTERNAL ELECTRODES HAVING NARROWED PORTION AND METHOD OF MANUFACTURING THE SAME

FIELD

A certain aspect of the present disclosure relates to a multilayer ceramic capacitor and a method of manufacturing the same.

BACKGROUND

A technique that attaches side margin portions later in a manufacturing process of a multilayer ceramic capacitor is known as disclosed in, for example, Japanese Patent Laid-Open No. 2012-209539 (Patent Document 1). This technique is advantageous in reducing the size and increasing the capacitance of the multilayer ceramic capacitor because the side surfaces of the multilayer body to which the internal electrodes are exposed can be reliably protected even by the thin side margin portions.

As an example, in the method of manufacturing a multilayer ceramic capacitor described in Patent Document 1, a multilayer sheet obtained by stacking ceramic sheets on which internal electrodes are printed is cut to fabricate a plurality of multilayer bodies each having cut surfaces to which the internal electrodes are exposed as side surfaces. Then, side margin portions are formed on respective side surfaces of the multilayer body by punching the ceramic sheets on the side surfaces of the multilayer body.

RELATED ART DOCUMENTS

Patent Documents

Japanese Patent Laid-Open No. 2012-209539

SUMMARY

When the above multilayer sheet is cut, since it is necessary to cut the internal electrodes harder than the ceramic sheets, stress applied to the cutting edge of the cutting blade is large. When the stress applied to the cutting blade is large, the cutting edge of the cutting blade obliquely enters the multilayer sheet, which tends to cause inclination of the cut surfaces to be the side surfaces of the plurality of multilayer bodies.

Therefore, an object of the present disclosure is to provide a technique capable of inhibiting a to-be-covered surface (i.e., side surface; also referred to as "covered surface") to be covered by a side margin portion of a multilayer body from inclining.

In one aspect of the present disclosure, there is provided a multilayer ceramic capacitor including: a ceramic body including a multilayer body and a pair of side margin portions, the multilayer body including a plurality of ceramic layers stacked in a direction of a first axis, a plurality of internal electrodes interposed between the plurality of ceramic layers, a pair of end surfaces perpendicular to a second axis orthogonal to the first axis, and a pair of side surfaces perpendicular to a third axis orthogonal to the first axis and the second axis, the pair of side margin portions covering the pair of side surfaces; and a pair of external electrodes covering the pair of end surfaces, respectively, wherein each of the plurality of internal electrodes includes a lead-out portion led out to either one of the pair of end surfaces of the multilayer body and a narrow-width portion having a width in a direction of the third axis smaller than that of the lead-out portion.

In the above multilayer ceramic capacitor, the plurality of internal electrodes are not exposed to at least one of the pair of covered surfaces of the multilayer body in the narrow-width portions. Therefore, in the manufacturing process of the above multilayer ceramic capacitor, when a plurality of multilayer bodies are cut from the multilayer sheet by the cutting blade, the cutting length of the conductor pattern corresponding to the internal electrode is small. As a result, the stress applied to the cutting edge of the cutting blade is reduced, so that the pair of covered surfaces of the multilayer body can be inhibited from being inclined.

Positions in the direction of the third axis of outermost end portions of two internal electrodes adjacent to each other in the direction of the first axis among the plurality of internal electrodes in a cross section orthogonal to the second axis may be aligned within a range of 1.0 μm in the direction of the third axis.

Among any of the two adjacent internal electrodes and at any cross section orthogonal to the second axis, a rate at which the positions in the direction of the third axis of the outermost end portions of the two internal electrodes adjacent to each other in the direction of the first axis in the cross section orthogonal to the second axis are found to be aligned within a range of 1.0 μm in the direction of the third axis may be 50% or greater.

The multilayer body and the side margin portions may be formed separately.

Each of the plurality of internal electrodes may include cutout portions that form outlines that are recessed inward in the direction of the third axis from the pair of side surfaces, respectively, in the narrow-width portion.

In each of the plurality of internal electrodes, a dimension of each of the cutout portions in a direction of the second axis may be larger than a dimension of each of the cutout portions in the direction of the third axis.

The outline of each of the cutout portions may include a portion having a displacement component in the direction of the second axis and a displacement component in the direction of the third axis.

In the portion of the outline in each of the cutout portions, the displacement component in the direction of the second axis may be larger than the displacement component in the direction of the third axis.

In each of the plurality of internal electrodes, the narrow-width portion may be provided at an end portion opposite to the lead-out portion in a direction of the second axis.

In each of the plurality of internal electrodes, the narrow-width portion may be provided at a central portion in a direction of the second axis.

The number of the plurality of internal electrodes that are stacked may be 50 or greater.

A dimension of the ceramic body in the direction of the first axis may be larger than a dimension of the ceramic body in the direction of the third axis.

In another aspect of the present disclosure, there is provided a method of manufacturing a multilayer ceramic capacitor, the method including: stacking a plurality of ceramic sheets each having a conductor pattern formed thereon in a direction of a first axis to prepare a multilayer sheet; cutting the multilayer sheet in the direction of the first axis along a plurality of cutting lines including a first cutting line extending along a second axis orthogonal to the first axis to separate the multilayer sheet into a plurality of multilayer bodies each having a pair of side surfaces perpendicular to a third axis orthogonal to the first axis and the second axis; and forming a pair of side margin portions on the pair of side surfaces of each of the plurality of multilayer bodies, respectively, wherein the conductor pattern is formed such that the conductor pattern is continuous in a direction of the third axis and a total dimension, along a direction of the second axis, of a portion thereof abutting the first cutting line is smaller than a total dimension, along the direction of the second axis, of a portion adjacent to, but separated from, the first cutting line in a direction of the third axis.

The conductor pattern may be formed with a recess that is provided in a portion along the first cutting line and has an outline including a portion in which a displacement component in the direction of the second axis is larger than a displacement component in the direction of the third axis.

DETAILED DESCRIPTION

Figure 1:
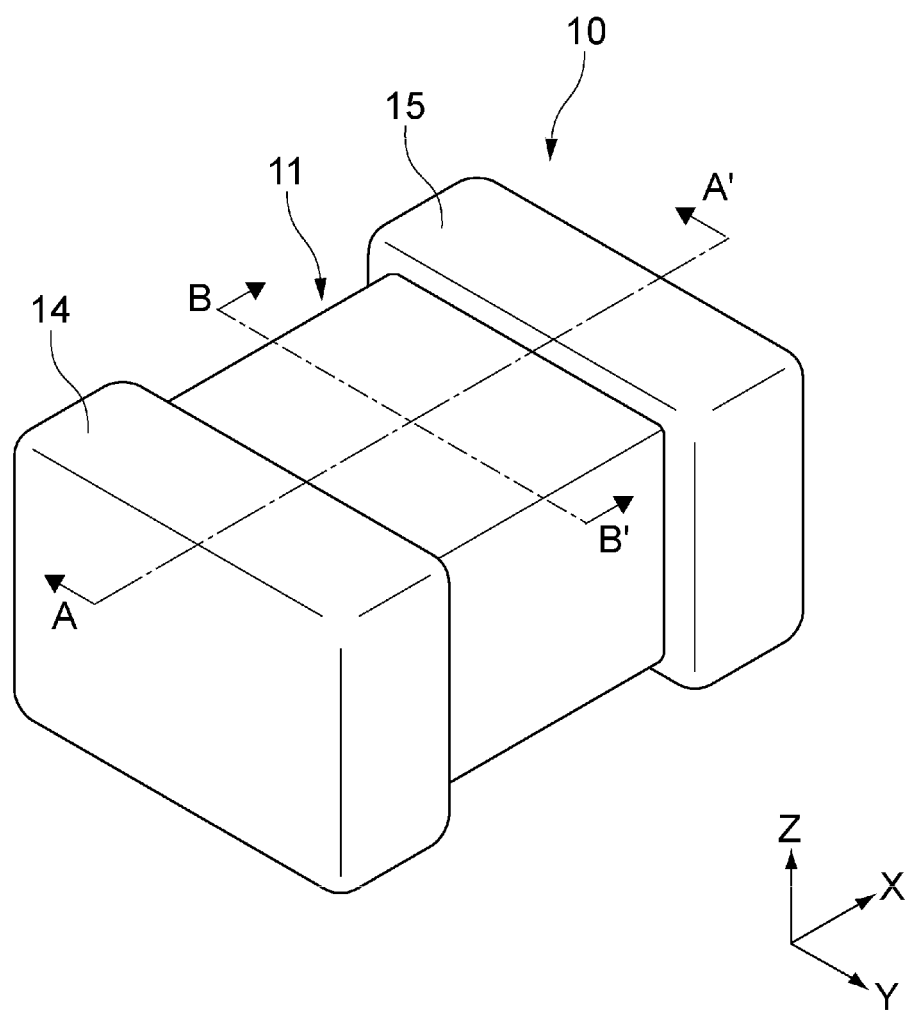
FIG. 1 is a perspective view of a multilayer ceramic capacitor in accordance with an embodiment.

Hereinafter, a multilayer ceramic capacitor 10 in accordance with an embodiment will be described with reference to the drawings. In the drawings, an X-axis, a Y-axis, and a Z-axis orthogonal to each other are illustrated as appropriate. The X-axis, the Y-axis, and the Z-axis define a fixed coordinate system that is fixed with respect to the multilayer ceramic capacitor 10.

Configuration of the Multilayer Ceramic Capacitor 10

Figure 2:
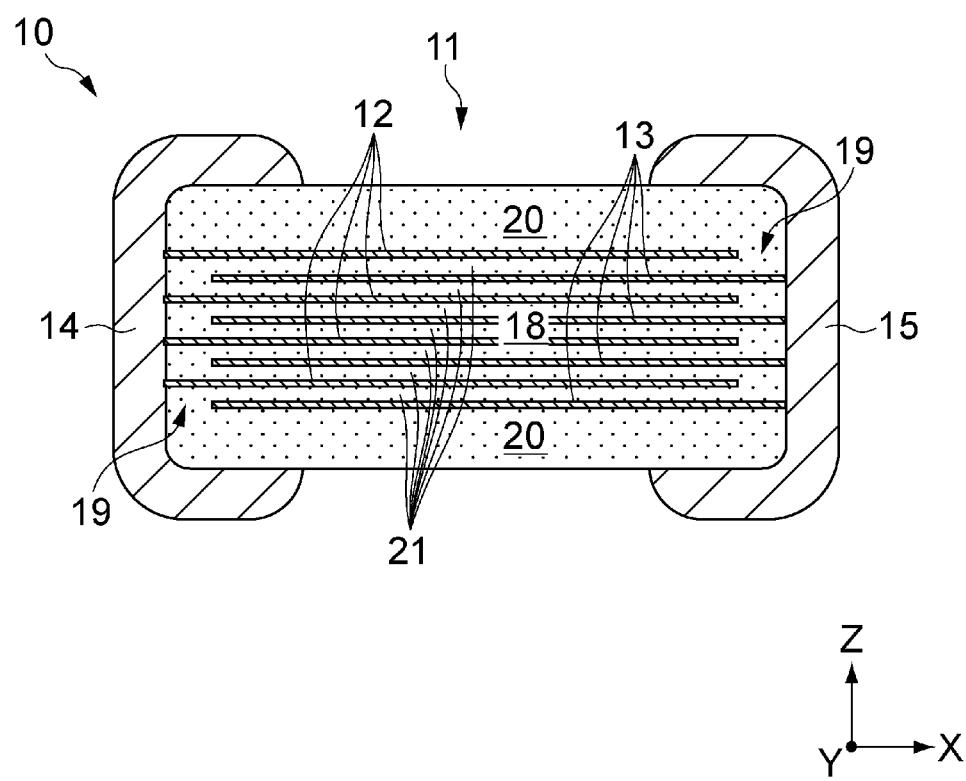
FIG. 2 is a cross-sectional view of the multilayer ceramic capacitor taken along line A-A' in FIG. 1.
Figure 3:
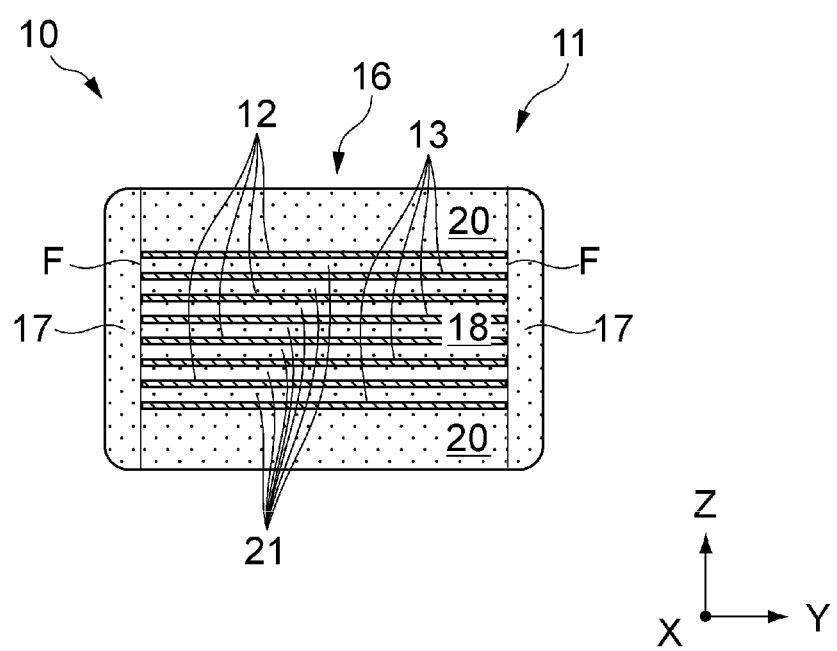
FIG. 3 is a cross-sectional view of the multilayer ceramic capacitor taken along line B-B' in FIG. 1.

FIG. 1 to FIG. 3 illustrate the multilayer ceramic capacitor 10 in accordance with the embodiment. FIG. 1 is a perspective view of the multilayer ceramic capacitor 10. FIG. 2 is a cross-sectional view of the multilayer ceramic capacitor 10 taken along the line A-A' in FIG. 1. FIG. 3 is a cross-sectional view of the multilayer ceramic capacitor 10 taken along the line B-B' in FIG. 1.

The multilayer ceramic capacitor 10 includes a ceramic body 11, a first external electrode 14, and a second external electrode 15. The ceramic body 11 is configured as a hexahedron having a pair of principal surfaces orthogonal to the Z-axis (a first axis), a pair of end surfaces orthogonal to the X-axis (a second axis), and a pair of side surfaces orthogonal to the Y-axis (a third axis).

The pair of end surfaces, the pair of side surfaces, and the pair of principal surfaces of the ceramic body 11 are all flat surfaces. The flat surface according to the present embodiment does not have to be strictly a flat surface as long as it is a surface recognized as being flat when viewed as a whole, and includes, for example, a surface having fine unevenness, a surface having a gently curved shape within a predetermined range, or the like.

The external electrodes 14 and 15 cover respective end surfaces of the ceramic body 11 and face each other in the X-axis direction with the ceramic body 11 interposed therebetween. The external electrodes 14 and 15 extend from respective end surfaces of the ceramic body 11 to the principal surfaces and the side surfaces. As a result, the external electrodes 14 and 15 have a U-shaped cross section parallel to the X-Z plane and a U-shaped cross section parallel to the X-Y plane.

The shape of each of the external electrodes 14 and 15 is not limited to that illustrated in FIG. 1. For example, the external electrodes 14 and 15 may extend from respective end surfaces of the ceramic body 11 to only one principal surface and have an L-shaped cross section parallel to the X-Z plane. Alternatively, the external electrodes 14 and 15 may extend to none of the principal surfaces and the side surfaces.

The external electrodes 14 and 15 are formed of a good conductor of electricity. Examples of the good conductor of electricity forming the external electrodes 14 and 15 include a metal containing copper (Cu), nickel (Ni), tin (Sn), palladium (Pd), platinum (Pt), silver (Ag), gold (Au), or the like as a main component or an alloy thereof. In this embodiment, the main component refers to a component having the highest content ratio.

The ceramic body 11 is formed of dielectric ceramics and includes a multilayer body 16 and a pair of side margin portions 17. The multilayer body 16 defines the pair of principal surfaces and the pair of end surfaces of the ceramic body 11. The pair of the side margin portions 17 are formed of, for example, dielectric ceramics of which the main component has the same material composition as the main component of the ceramic body 11, cover a pair of covered surfaces F of the multilayer body 16 facing each other in the Y-axis direction, and define the pair of side surfaces of the ceramic body 11.

The multilayer body 16 has a structure in which a plurality of flat plate-shaped ceramic layers 21 extending along the X-Y plane are stacked in the Z-axis direction. The multilayer body 16 has an overlap portion 18, a pair of end margin portions 19 located on both sides of the overlap portion 18 in the X-axis direction, and a pair of cover portions 20 located on both sides of the overlap portion 18 in the Z-axis direction.

The multilayer body 16 includes a plurality of sheet-like first and second internal electrodes 12 and 13, which are disposed between a plurality of the ceramic layers 21 and extend along the X-Y plane. The internal electrodes 12 and 13 are alternately arranged along the Z-axis direction and face each other in the Z-axis direction with the ceramic layer 21 interposed therebetween in the overlap portion 18. Neither the internal electrode 12 nor 13 is disposed in the cover portion 20.

The first internal electrodes 12 are led out along the X-axis direction from the overlap portion 18 to the end margin portion 19 defining the end surface covered with the first external electrode 14, and are connected to the first external electrode 14. On the other hand, the first internal electrodes 12 are insulated from the second external electrode 15 by the end margin portion 19 defining the end surface covered with the second external electrode 15.

The second internal electrodes 13 are led out along the X-axis direction from the overlap portion 18 to the end margin portion 19 defining the end surface covered with the second external electrode 15, and are connected to the second external electrode 15. On the other hand, the second internal electrodes 13 are insulated from the first external electrode 14 by the end margin portion 19 defining the end surface covered with the first external electrode 14.

As illustrated in FIG. 3, in the multilayer body 16, the outermost end portions located at the outermost sides in the Y-axis direction of the internal electrodes 12 and 13 are located on the covered surfaces F covered with the side margin portions 17. Although details will be described later, in the manufacturing process of the multilayer ceramic capacitor 10, the multilayer body 16 and the side margin portions 17 are separately formed, and the side margin portions 17 are then attached to the covered surfaces F of the multilayer body 16, respectively. Accordingly, in the ceramic body 11, the positions in the Y-axis direction of the outermost end portions of the two internal electrodes 12 and 13 adjacent to each other in the Z-axis direction are aligned within a range of 1.0 µm or less in the Y-axis direction. The rate at which the outermost end portions of the adjacent internal electrodes 12 and 13 are formed to be aligned within the above range is only required to be 50% or greater. That is, for example, in the cross section parallel to the Y-Z plane, when the outermost end portions in the Y-axis direction of the two internal electrodes 12 and 13 adjacent to each other in the Z-axis direction are checked at 30 locations, the outermost end portions of the two internal electrodes 12 and 13 are only required to be aligned in a range of 1.0 µm or less at 15 or more locations.

In the ceramic body 11, the overlap portion 18 and the pair of the end margin portions 19 are covered with the pair of the cover portions 20 from respective sides in the Z-axis direction, and are covered with the pair of the side margin portions 17 from respective sides in the Y-axis direction. Therefore, in the ceramic body 11, the internal electrodes 12 and 13 are protected by the cover portions 20 and the side margin portions 17.

With such a structure, in the multilayer ceramic capacitor 10, when a voltage is applied between the external electrodes 14 and 15, a voltage is applied to a plurality of the ceramic layers 21 between the internal electrodes 12 and 13 in the overlap portion 18. As a result, in the multilayer ceramic capacitor 10, electric charge corresponding to the voltage between the external electrodes 14 and 15 is stored.

In the ceramic body 11, dielectric ceramics having a high dielectric constant is used in order to increase the capacitance of each ceramic layer 21 between the internal electrodes 12 and 13. Examples of the dielectric ceramics having a high dielectric constant include, but are not limited to, materials having a perovskite structure containing barium (Ba) and titanium (Ti), typified by barium titanate ($BaTiO_3$).

Dielectric ceramics may be strontium titanate ($SrTiO_3$), calcium titanate ($CaTiO_3$), magnesium titanate ($MgTiO_3$), calcium zirconate ($CaZrO_3$), calcium zirconate titanate ($Ca(Zr, Ti)O_3$), calcium barium zirconate titanate (($Ba, Ca)(Zr, Ti)O_3$), barium zirconate ($BaZrO_3$), or titanium oxide ($TiO_2$).

The internal electrodes 12 and 13 are formed of a good conductor of electricity. A typical example of the good conductor of electricity forming the internal electrodes 12 and 13 is nickel (Ni), and other metals containing copper (Cu), palladium (Pd), platinum (Pt), silver (Ag), gold (Au), or the like as a main component or alloys thereof may be used.

Figure 4A:
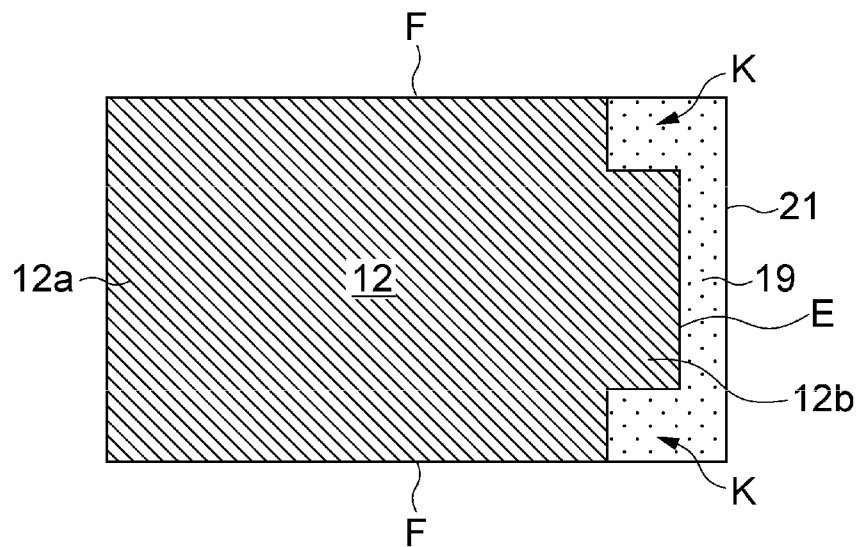
FIG. 4A and FIG. 4B are plan views of a ceramic layer and an internal electrode of the multilayer ceramic capacitor.
Figure 4B:
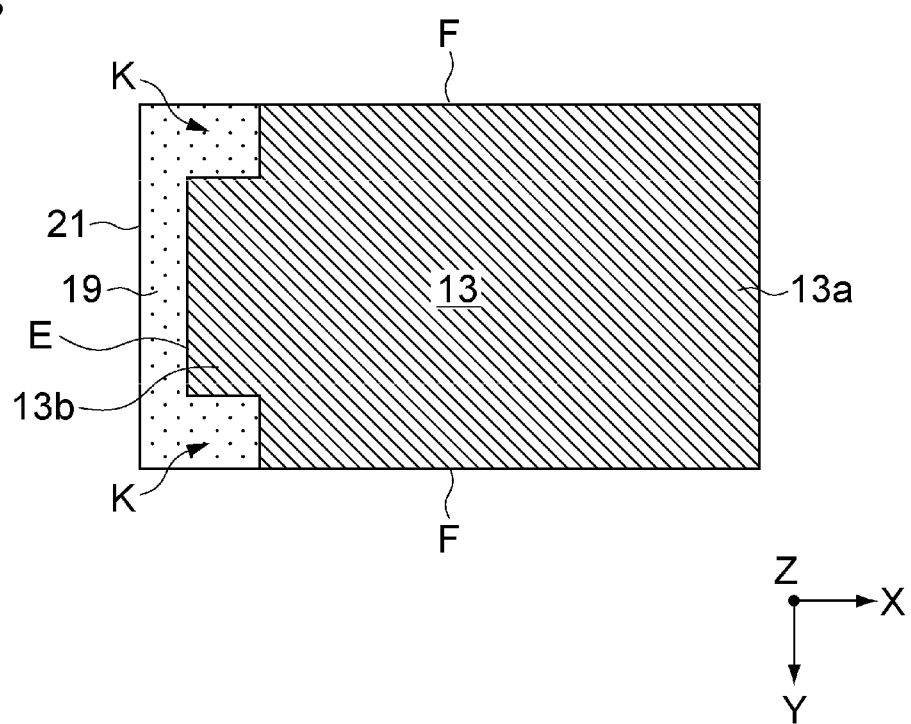

FIG. 4A and FIG. 4B are plan views illustrating the ceramic layers 21 on which the internal electrodes 12 and 13 are formed in the multilayer body 16, respectively. In detail, FIG. 4A illustrates the ceramic layer 21 on which the first internal electrode 12 is formed. FIG. 4B illustrates the ceramic layer 21 on which the second internal electrodes 13 is formed.

The first internal electrode 12 has a first lead-out portion 12a and a first narrow-width portion 12b. The first lead-out portion 12a is an end portion in the X-axis direction that is led out to the end surface through the end margin portion 19 and is connected to the first external electrode 14. The first narrow-width portion 12b constitutes another end portion in the X-axis direction opposite to the first lead-out portion 12a, and is formed to have a narrower width in the Y-axis direction than other portions.

The second internal electrode 13 includes a second lead-out portion 13a and a second narrow-width portion 13b. The second lead-out portion 13a is an end portion in the X-axis direction that is led out to the end surface through the end margin portion 19 and is connected to the second external electrode 15. The second narrow-width portion 13b constitutes another end portion in the X-axis direction opposite to the second lead-out portion 13a, and is formed to have a narrower width in the Y-axis direction than the other portions.

In the internal electrodes 12 and 13, each of the narrow-width portions 12b and 13b is provided with a pair of recessed cutout portions K extending inward in the Y-axis direction from the pair of the covered surfaces F. In other words, in the internal electrodes 12 and 13, by providing the cutout portions K, the outline along the X-Y plane has a shape in which the width narrows in the Y-axis direction in each of the narrow-width portions 12b and 13b.

The pair of the cutout portions K of each of the internal electrodes 12 and 13 are line-symmetrical to each other about the center line that passes through the center in the Y-axis direction and is parallel to the X-axis direction. Further, each of the cutout portions K has constant dimensions in both the X-axis direction and the Y-axis direction. Therefore, in the internal electrodes 12 and 13, the dimensions of the narrow-width portions 12b and 13b in the Y-axis direction are constant along the X-axis.

In the internal electrodes 12 and 13, the portion other than the narrow-width portion 12b or 13b is provided across the entire width of the ceramic layer 21 in the Y-axis direction, and constitute the outermost end portions in the Y-axis direction exposed to the pair of the covered surfaces F. On the other hand, in the internal electrodes 12 and 13, both end portions in the Y-axis direction of the narrow-width portions 12b and 13b in which the cutout portions K are formed are not exposed to the pair of the covered surfaces F.

In the internal electrodes 12 and 13, provision of the narrow-width portions 12b and 13b reduces the dimensions in the X-axis direction of the portions exposed to the pair of the covered surfaces F. Thus, in the multilayer ceramic capacitor 10, the pair of the covered surfaces F are less likely to be inclined with respect to the X-Z plane. This point will be described in detail in the section "Method of Manufacturing the Multilayer Ceramic Capacitor 10".

In addition, in the multilayer ceramic capacitor 10, by limiting the portions in which the dimension in the X-axis direction is reduced only to the narrow-width portions 12b and 13b in the internal electrodes 12 and 13, respectively, it is possible to reduce a decrease in the opposing area of the internal electrodes 12 and 13 in the overlap portion 18. That is, the multilayer ceramic capacitor 10 can achieve the above advantages while inhibiting a decrease in capacitance.

Figure 5:
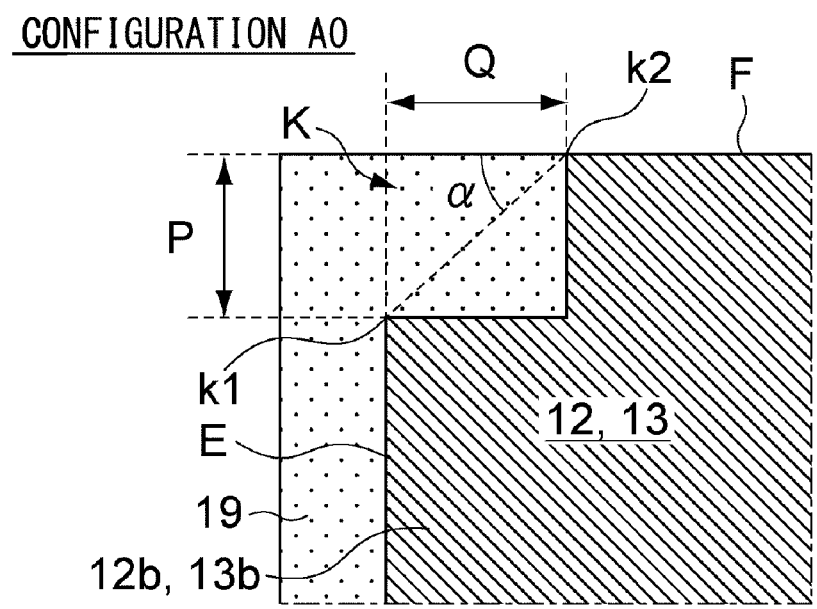
FIG. 5 is a partial enlarged view of FIG. 4A and FIG. 4B.

FIG. 5 is a partial plan view representatively illustrating only one of the pair of the cutout portions K of each of the internal electrodes 12 and 13. In FIG. 5, a dimension P and a dimension Q are presented for each cutout portion K. The dimension P of the cutout portion K is a dimension in the Y-axis direction along the side E that defines the tip of each of the narrow-width portions 12b and 13b. The dimension Q of the cutout portion K is a dimension in the X-axis direction along the covered surface F.

In each cutout portion K, the dimension Q in the X-axis direction of each cutout portion K is preferably larger than the dimension P in the Y-axis direction in order to more favorably achieve the above advantages. That is, in the cutout portion K, an angle α between the covered surface F and a straight line connecting an end point k1 on the side E and an end point k2 on the covered surface F is preferably less than 45°.

In the present embodiment, the narrow-width portions 12b and 13b of the internal electrodes 12 and 13 are provided at positions corresponding to the overlap portion 18, so that the above advantages can be achieved more effectively. In each of the internal electrodes 12 and 13, neither the narrow-width portion 12b nor 13b is provided in the lead-out portions 12a and 13a, so that the connection resistance to the external electrodes 14 and 15 can be made low.

The configuration of the present embodiment is particularly effective in a high-height configuration in which the number of stacked internal electrodes 12 and 13 in the multilayer body 16 is large. Specifically, the configuration of the present embodiment is particularly effective in a configuration in which the dimension of the ceramic body 11 in the Z-axis direction is larger than that in the Y-axis direction, and is particularly effective in a configuration in which the total number of the internal electrodes 12 and 13 in the multilayer body 16 is 50 or greater.

Method of Manufacturing the Multilayer Ceramic Capacitor 10

Figure 6:
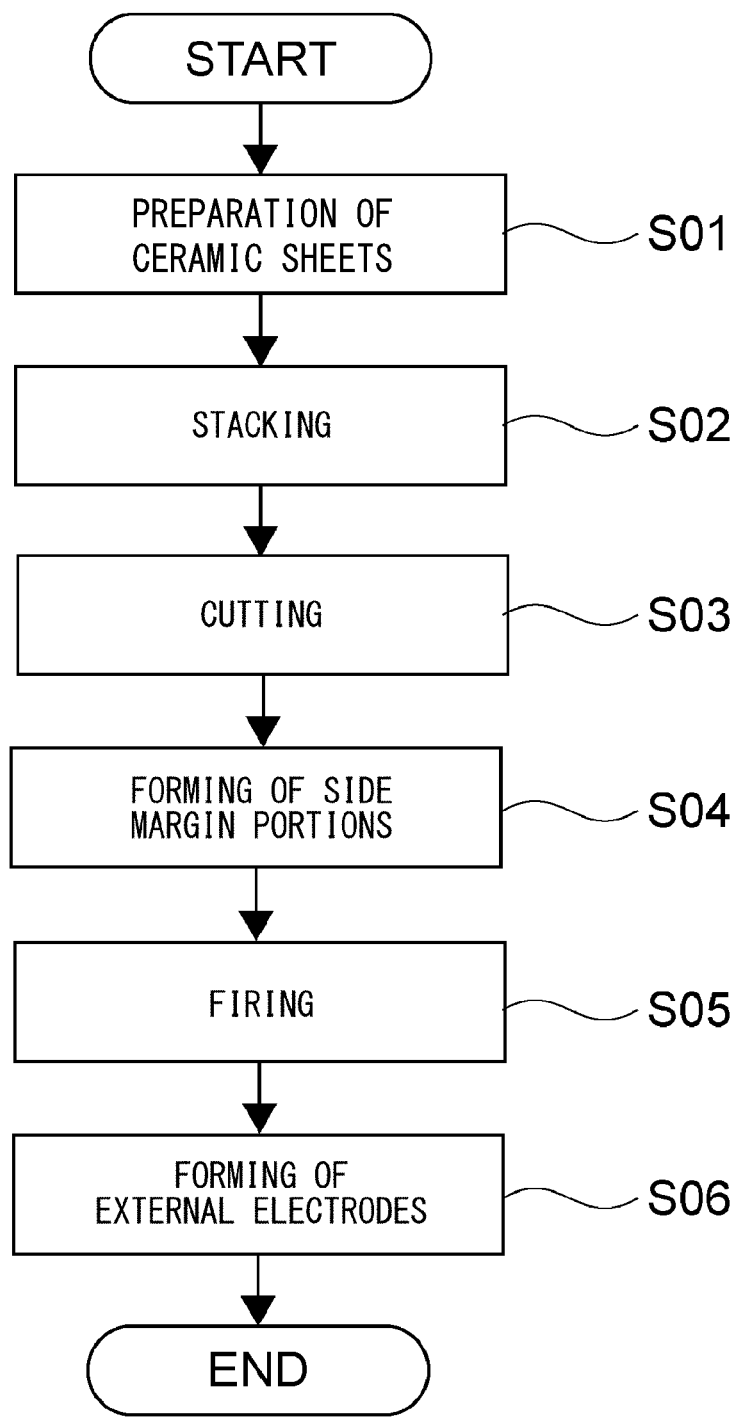
FIG. 6 is a flowchart illustrating a method of manufacturing the multilayer ceramic capacitor.
Figure 7:
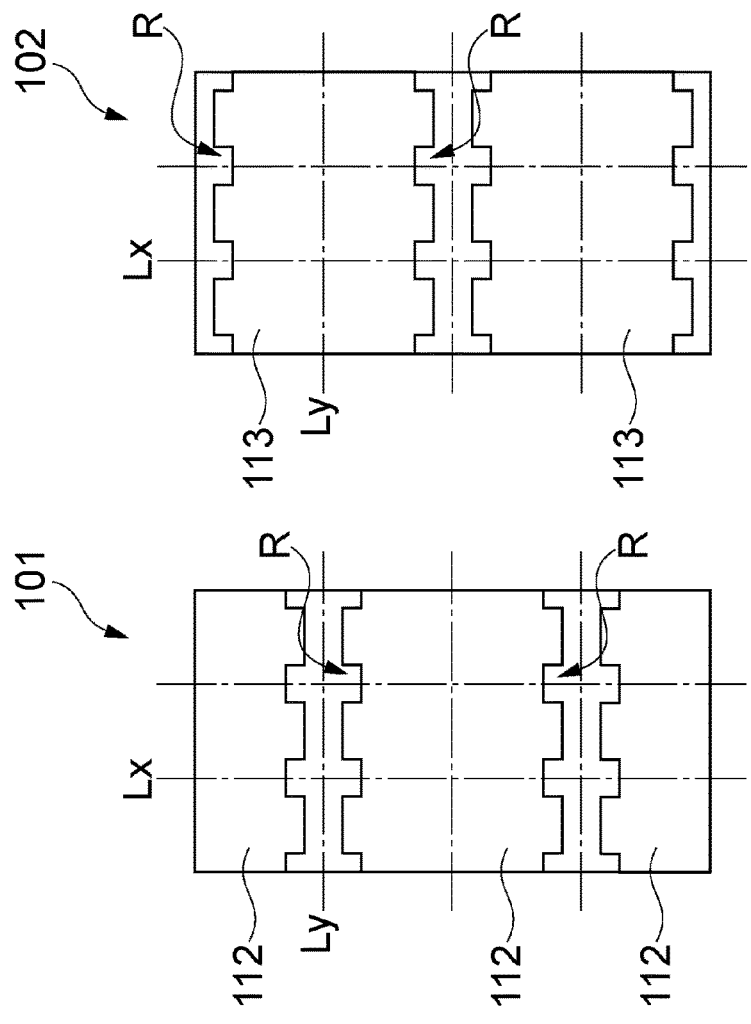
FIG. 7A to FIG. 7C are plan views of ceramic sheets prepared in step S01.

FIG. 6 is a flowchart illustrating a method of manufacturing the multilayer ceramic capacitor 10 in accordance with the present embodiment. FIG. 7A to FIG. 11 illustrate a manufacturing process of the multilayer ceramic capacitor 10. Hereinafter, the method of manufacturing the multilayer ceramic capacitor 10 will be described along FIG. 6 with reference to FIG. 7A to FIG. 11 as appropriate.

(Step S01: Preparation of Ceramic Sheets)

In step S01, first and second ceramic sheets 101 and 102 for forming the overlap portion 18 and the end margin portions 19, and third ceramic sheets 103 for forming the cover portions 20 are prepared. The ceramic sheets 101, 102, and 103 are configured as unfired dielectric green sheets containing dielectric ceramics as a main component.

The ceramic sheets 101, 102, and 103 are formed into a sheet-like shape using, for example, a roll coater or a doctor blade. The thicknesses of the ceramic sheets 101 and 102 are adjusted in accordance with the thickness of the ceramic layer 21 in the overlap portion 18 after firing. The thickness of the third ceramic sheet 103 can be appropriately adjusted.

FIG. 7A to FIG. 7C are plan views of the ceramic sheets 101, 102, and 103, respectively. At this stage, the ceramic sheets 101, 102, and 103 are configured as large sheets that are not separated into individual pieces. In FIG. 7A to FIG. 7C, a first cutting line Lx parallel to the X-axis and a second cutting line Ly parallel to the Y-axis are illustrated as cutting lines for separating a multilayer sheet into individual multilayer ceramic capacitors 10.

As illustrated in FIG. 7A and FIG. 7B, unfired first and second conductor patterns 112 and 113 corresponding to the internal electrodes 12 and 13 are formed on the first and second ceramic sheets 101 and 102, respectively. An unfired conductor pattern is not formed on the third ceramic sheet 103 corresponding to the cover portion 20 in which no internal electrode is provided.

The conductor patterns 112 and 113 can be formed by applying any conductive paste to the ceramic sheets 101 and 102. The method for applying the conductive paste can be freely selected from known techniques. For example, a screen printing method or a gravure printing method can be used to apply the conductive paste.

In the conductor patterns 112 and 113, a gap in the X-axis direction along the cutting line Ly is formed every other cutting line Ly. The gaps between the conductor patterns 112 and the gaps between the conductor patterns 113 are alternately arranged in the X-axis direction. That is, the cutting lines Ly passing through the gaps between the first conductor patterns 112 and the cutting lines Ly passing through the gaps between the second conductor patterns 113 are alternately arranged.

With such a configuration, in the conductor patterns 112 and 113, strip-shaped portions each intersecting the cutting lines Lx and extending along the Y-axis direction are arranged at intervals along the X-axis direction. In each of the conductor patterns 112 and 113, recesses R that correspond to the cutout portions K and recess from the both sides in the X-axis direction are formed in the portions through which the cutting lines Lx pass in each strip-shaped portion.

In the conductor patterns 112 and 113, the total dimension, along the X-axis direction, of a portion abutting the cutting line Lx is smaller by the recess R than the dimension, along the X-axis direction, of a portion adjacent to, but separated from, the cutting line Lx in the Y-axis direction. That is, the lengths (cutting lengths) of the portions of the conductor patterns 112 and 113 that are required to be cut when cutting along the cutting line Lx are reduced.

(Step S02: Stacking)

Figure 8:
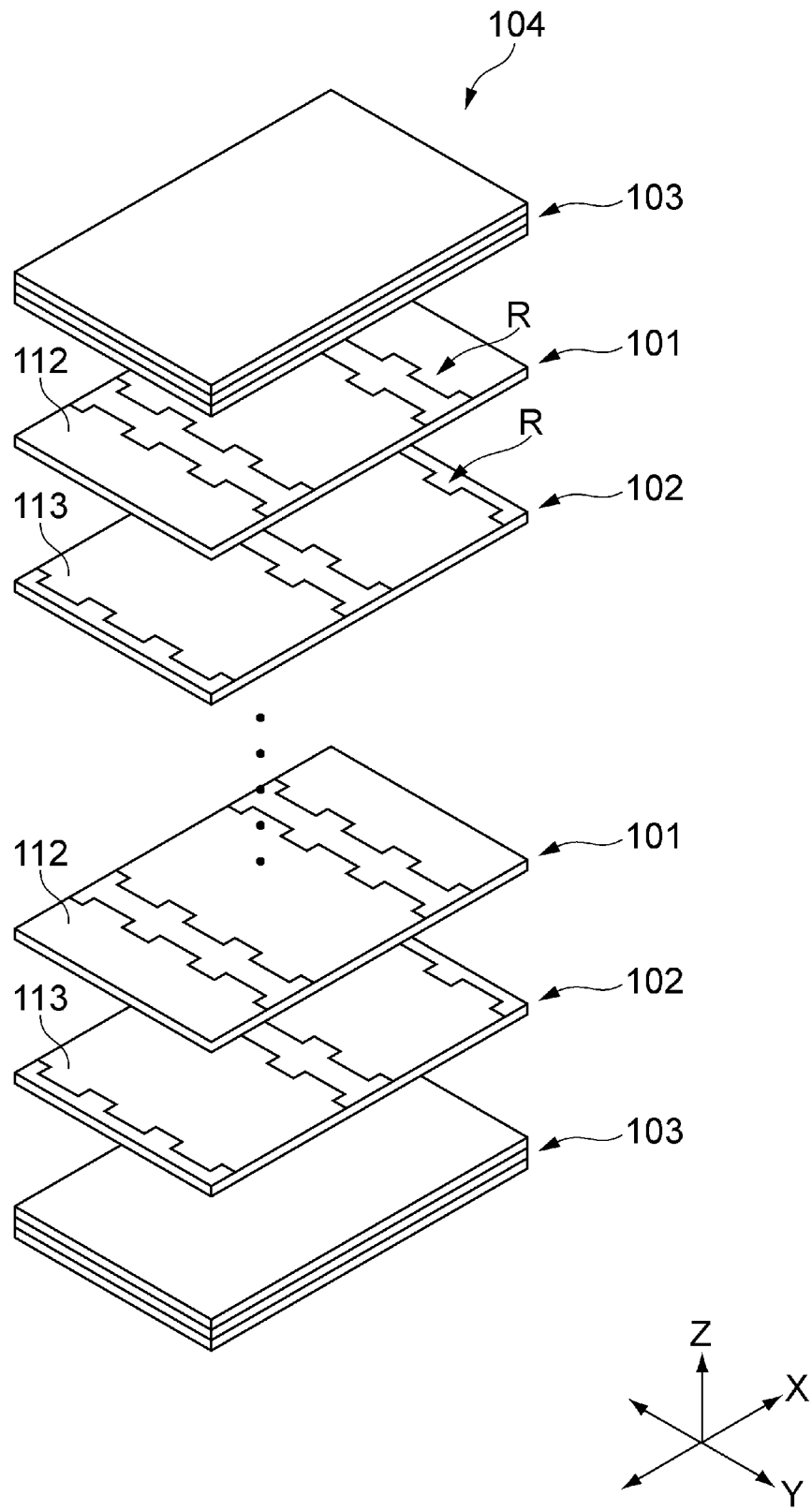
FIG. 8 is a perspective view illustrating step S02.

In step S02, the ceramic sheets 101, 102, and 103 prepared in step S01 are stacked as illustrated in FIG. 8 to produce a multilayer sheet 104. In the multilayer sheet 104, the first ceramic sheets 101 and the second ceramic sheets 102 corresponding to the overlap portion 18 and the end margin portions 19 are alternately stacked in the Z-axis direction.

In the multilayer sheet 104, the third ceramic sheets 103 corresponding to the cover portions 20 are stacked on the top and bottom surfaces in the Z-axis direction of the alternately stacked ceramic sheets 101 and 102. In the example illustrated in FIG. 8, three third ceramic sheets 103 are stacked, but the number of the third ceramic sheets 103 can be changed as appropriate.

The multilayer sheet 104 is integrated by pressure-bonding the ceramic sheets 101, 102, and 103. For pressure bonding of the ceramic sheets 101, 102, and 103, for example, hydrostatic pressurization or uniaxial pressurization is preferably used. Thereby, it is possible to increase the density of the multilayer sheet 104.

(Step S03: Cutting)

Figure 9:
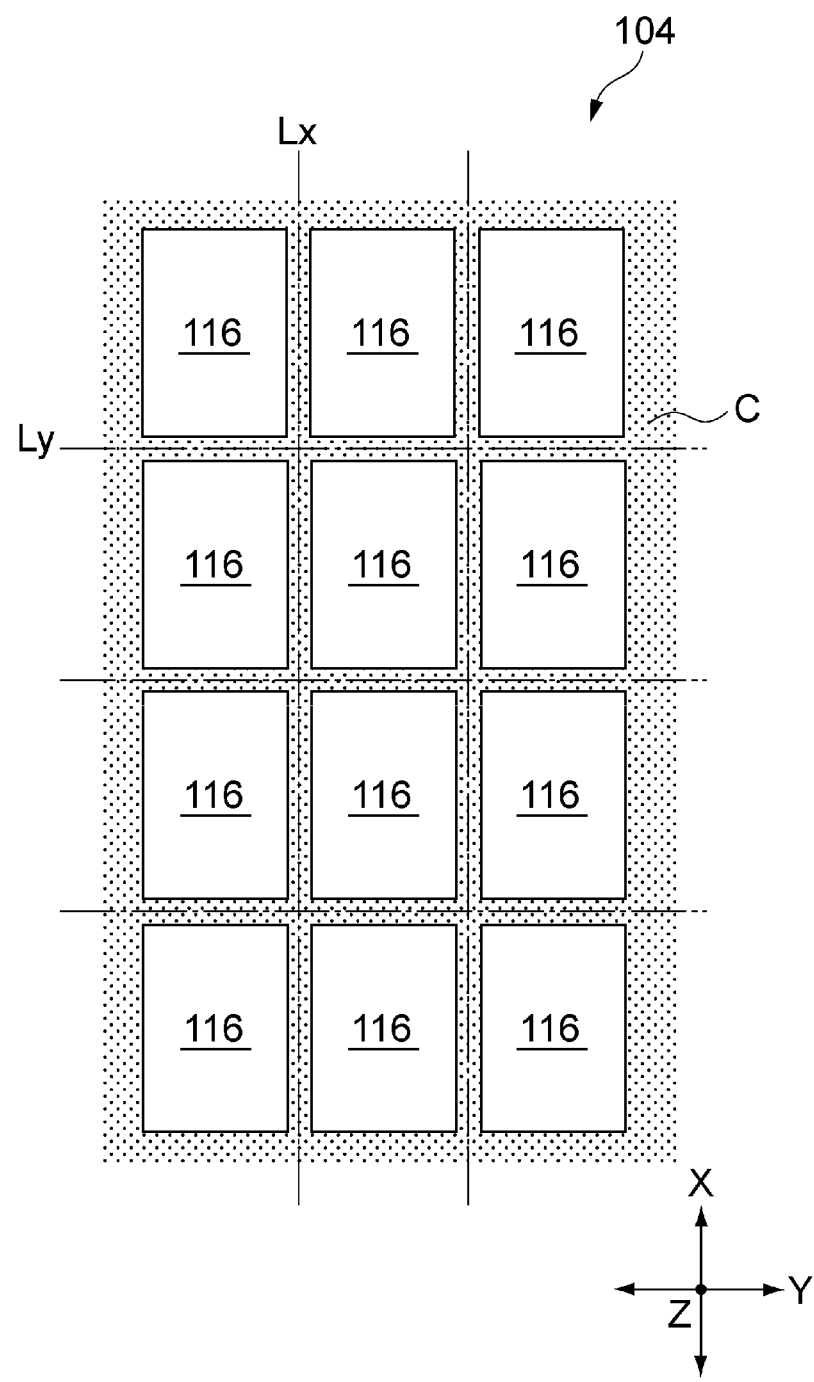
FIG. 9 is a plan view illustrating step S03.
Figure 10:
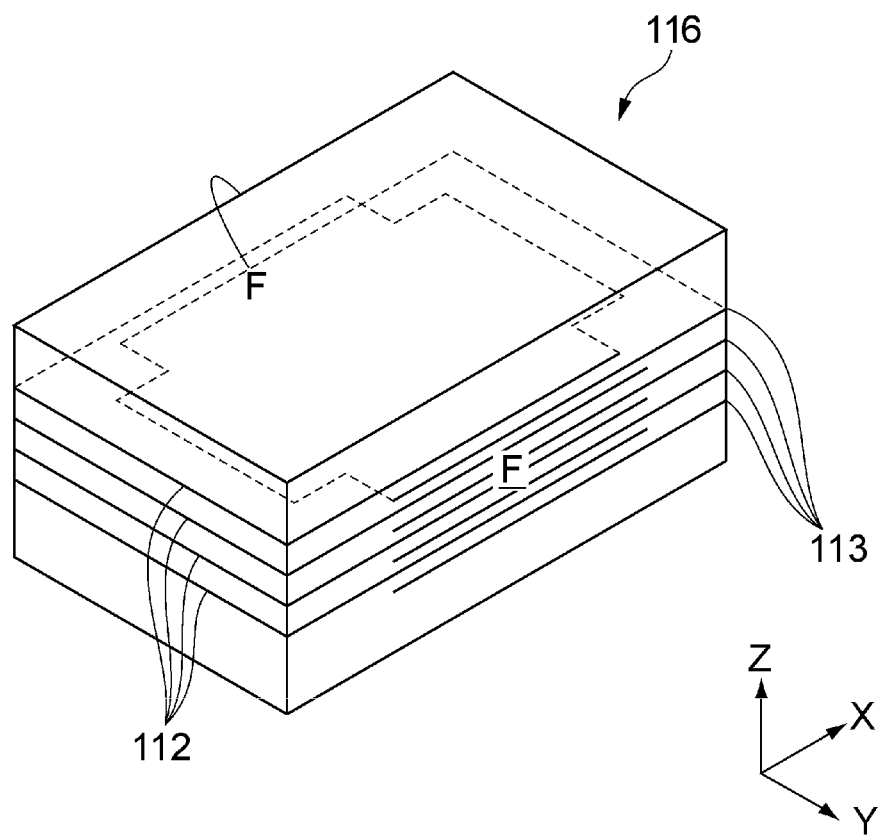
FIG. 10 is a perspective view of a multilayer body obtained in step S03.

In step S03, the multilayer sheet 104 obtained in step S02 is cut along the cut lines Lx and Ly as illustrated in FIG. 9, thereby producing unfired multilayer bodies 116 illustrated in FIG. 10. The multilayer body 116 corresponds to the multilayer body 16 after firing. In step S03, the multilayer sheet 104 is cut from the upper side to the lower side in the Z-axis direction using, for example, a press-cutting blade as the cutting blade.

That is, in step S03, the cutting edge of the cutting blade is sequentially aligned with the cut lines Lx and Ly and pressed downward in the Z-axis direction to enter the multilayer sheet 104, whereby the multilayer sheet 104 can be cut into pieces. At this time, large stress is applied to the cutting edge of the cutting blade from the conductor patterns 112 and 113, which are harder than the ceramic sheets 101, 102, and 103.

When a large stress is being applied to the cutting edge of the cutting blade, only the cutting edge is shifted from the cutting lines Lx and Ly, and thus the direction in which the cutting blade enters the multilayer sheet 104 is likely to be an oblique direction inclined with respect to the Z-axis direction. As a result, since the cut surface of the multilayer sheet 104 is inclined with respect to the Z-axis, the end surfaces and the covered surfaces F of the resulting multilayer body 16 are inclined with respect to the Z-axis.

As illustrated in FIG. 2 and FIG. 3, in the multilayer ceramic capacitor 10, the number of the internal electrodes 12 and 13 stacked on each of the covered surfaces F defining the overlap portion 18 is two times the number of the internal electrodes 12 and 13 stacked in each of the end margin portions 19 defining the end surfaces. Therefore, in step S03, more conductor patterns 112 and 113 are cut along the cut line Lx than along the cut line Ly.

For this reason, in the step S03, a particularly large stress is likely to be applied to the cutting edge of the cutting blade at the time of cutting the multilayer sheet along the cut line Lx. In this respect, in the present embodiment, the recess portions R are provided in the conductor patterns 112 and 113, and the cutting lengths of the conductor patterns 112 and 113 along the cutting line Lx is reduced, so that a stress applied to the cutting edge of the cutting blade at the time of cutting the multilayer sheet 104 along the cutting line Lx is reduced.

Further, at the time of cutting the multilayer sheet 104 along the cutting line Lx, portions that are adjacent to each other at both sides of the cutting line Lx in the Y-axis direction and where the conductor patterns 112 and 113 outside the recess portions R are present act to press the cutting blade from both sides in the Y-axis direction. As a result, in step S03, the direction in which the cutting blade enters the multilayer sheet 104 is regulated, and the cutting edge of the cutting blade is less likely to shift in the Y-axis direction.

In the present embodiment, by the action of the recess portions R provided in the conductor patterns 112 and 113, the stress applied to the cutting edge of the cutting blade at the time of cutting along the cutting line Lx is reduced, and the entering direction of the cutting blade into the multilayer sheet 104 is regulated. Therefore, the pair of the covered surfaces F of the multilayer body 116 is less likely to be inclined with respect to the X-Z plane.

(Step S04: Forming of Side Margin Portions)

Figure 11:
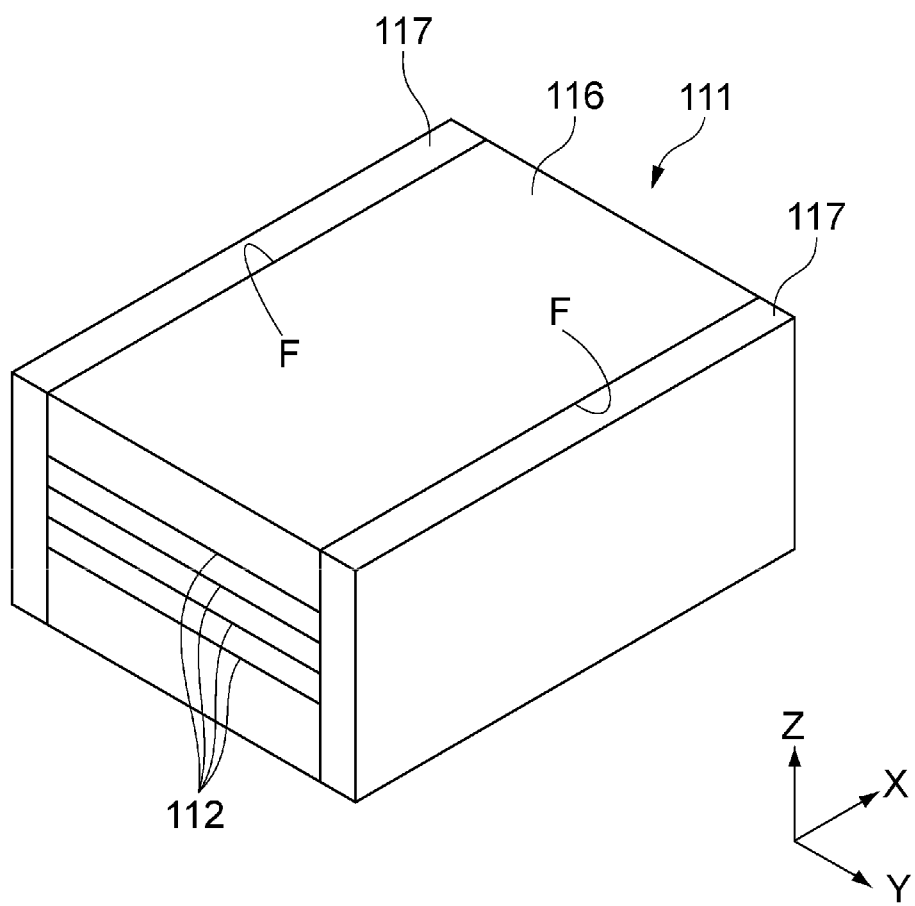
FIG. 11 is a perspective view of a ceramic body obtained in step S04.

In step S04, a pair of unfired side margin portions 117 are provided on the pair of the covered surfaces F of the unfired multilayer body 116 obtained in step S03, respectively. As a result, as illustrated in FIG. 11, an unfired ceramic body 111 having a pair of the covered surfaces F covered with the pair of the unfired side margin portions 117, respectively, is obtained.

The side margin portions 117 can be formed by any method. The side margin portion 117 can be formed using, for example, a ceramic sheet obtained by forming ceramic slurry into a sheet shape. In this case, the ceramic sheet can be punched at the covered surface F of the multilayer body 116, or can be cut in advance and attached to the covered surface F of the multilayer body 116, for example.

In order to form the side margin portions 117, ceramic slurry that has not been shaped may be used as it is instead of a ceramic sheet that has been formed into a sheet shape in advance. In this case, the ceramic slurry can be applied to the covered surface F of the multilayer body 116 by, for example, immersing the covered surface F of the multilayer body 116 in the ceramic slurry.

(Step S05: Firing)

In step S05, the ceramic body 111 illustrated in FIG. 11 obtained in step S04 is fired to prepare the ceramic body 11 of the multilayer ceramic capacitor 10 illustrated in FIG. 1 to FIG. 3. That is, through step S05, the multilayer body 116 becomes the multilayer body 16, and the side margin portions 117 become the side margin portions 17.

The firing temperature in step S05 can be determined based on the sintering temperature of the ceramic body 111. For example, when a barium titanate ($BaTiO_3$)-based material is used, the firing temperature can be about 1000° C. to 1300° C. The firing can be performed, for example, in a reducing atmosphere or a low oxygen partial pressure atmosphere.

(Step S06: Forming of External Electrodes)

In step S06, the external electrodes 14 and 15 are formed on respective end portions in the X-axis direction of the ceramic body 11 obtained in step S07, thereby producing the multilayer ceramic capacitor 10 illustrated in FIG. 1 to FIG. 3. The method of forming the external electrodes 14 and 15 in step S06 can be freely selected from known methods.

Through the above process, the multilayer ceramic capacitor 10 is completed. In this manufacturing method, since the pair of the side margin portions 117 are formed on the pair of the covered surfaces F of the multilayer body 116 to which the conductor patterns 112 and 113 are exposed, the positions in the Y-axis direction of the outermost end portions of the two internal electrodes 12 and 13 adjacent to each other in the Z-axis direction in the ceramic body 11 are aligned within a range of 1.0 μm or less in the Y-axis direction.

Other Configuration Examples of Cutout Portions K

FIG. 12A to FIG. 19 illustrate other configuration examples of the cutout portions K of the internal electrodes 12 and 13 of the multilayer ceramic capacitor 10. In the multilayer ceramic capacitor 10, the configuration of the cutout portions K of the internal electrodes 12 and 13 is not limited to the configurations described below, and various modifications may be made to each configuration.

Figure 12A:
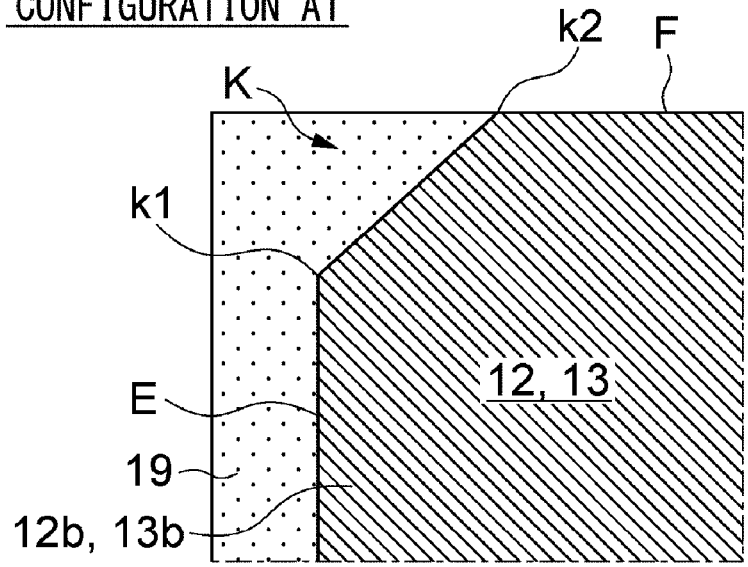
FIG. 12A and FIG. 12B illustrate configurations A1 and A2 of the cutout portion of the internal electrode, respectively.

The cutout portion K in accordance with a configuration A1 illustrated in FIG. 12A has a linear outline connecting the end points k1 and k2. In the configuration A1, since the narrow-width portions 12*b* and 13*b* have a tapered shape that widens toward the lead-out portions 12*a* and 13*a*, respectively, the direction in which the cutting edge of the cutting blade enters the multilayer sheet 104 at the time of cutting along the cut line Lx in step S03 is more favorably regulated, and the pair of the covered surfaces F of the multilayer body 16 is more effectively inhibited from being inclined.

Figure 12B:
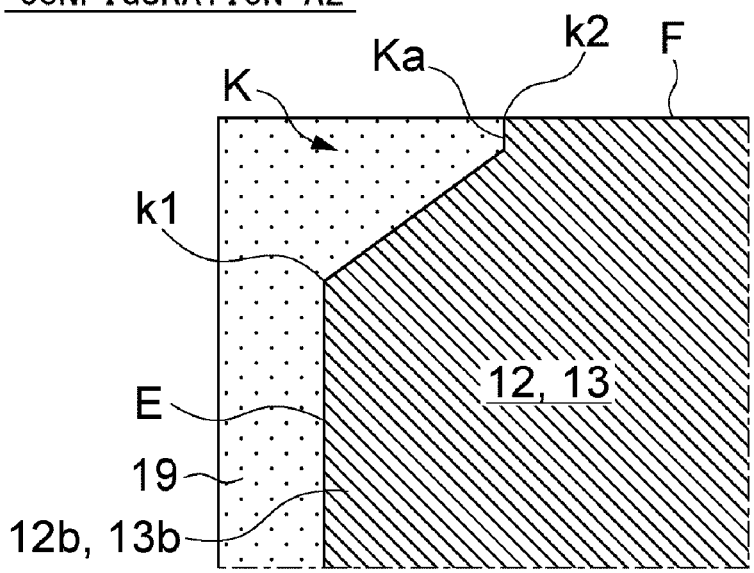

The cutout portion K in accordance with a configuration A2 illustrated in FIG. 12B differs from that of the configuration A1 in that a cutting margin portion Ka parallel to the Y-axis is provided at a position adjacent to the end point k2. In the configuration A2, even when the cut position is slightly shifted in the Y-axis direction from the cut line Lx in the step S03, the dimension of the portion where the internal electrode 12 or 13 is exposed on the covered surface F does not change as long as the cut position is within the cut margin portion Ka. In the configuration A2, the dimension of the cut margin portion Ka in the Y-axis direction is preferably 20 µm or more and 50 µm or less. Also in the configuration A2, when the narrow-width portions 12*b* and 13*b* have a tapered shape at a position within 150 µm from the covered surface F, an effect similar to that of the configuration A1 can be obtained.

Figure 13A:
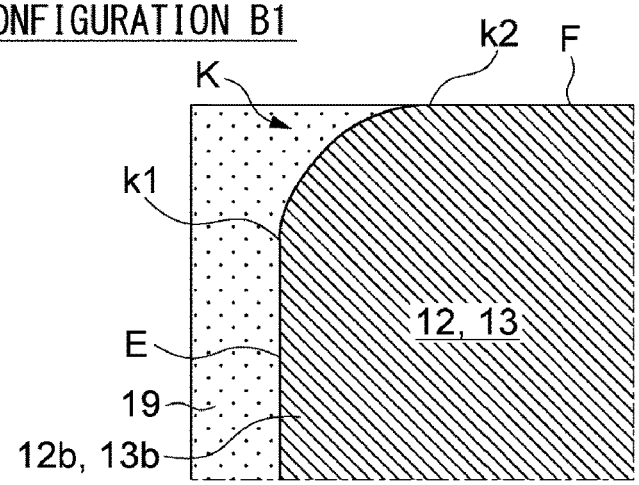
FIG. 13A to FIG. 13C illustrate configurations B1 to B3 of the cutout portion of the internal electrode, respectively.

The cutout portion K in accordance with a configuration B1 illustrated in FIG. 13A has a convex curved outline connecting the end points k1 and k2. The cutout portion K in accordance with a configuration B2 illustrated in FIG. 13B has a concave curved outline connecting the end points k1 and k2. The cutout portion K in accordance with a configuration B3 illustrated in FIG. 13C has an outline having a shape obtained by combining convex and concave curved shapes.

Figure 14:
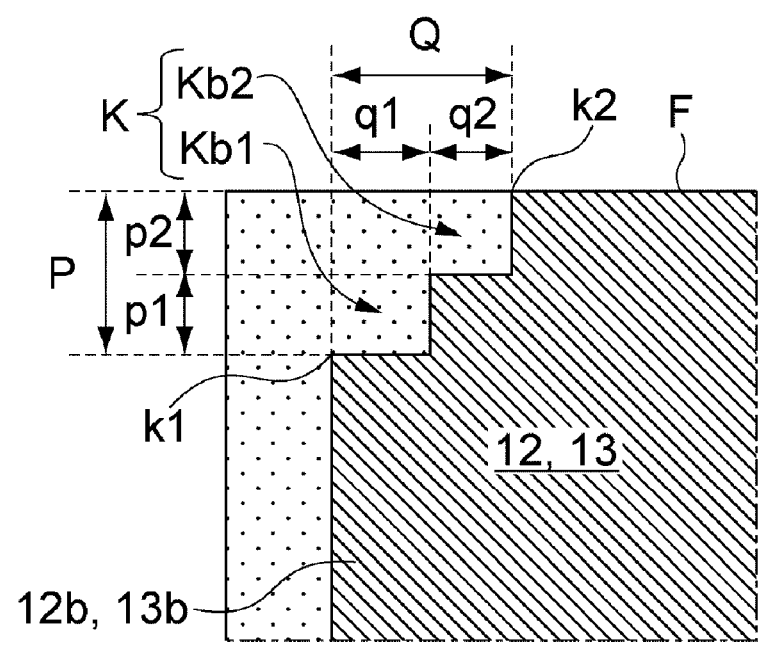
FIG. 14 illustrates a configuration C of the cutout portion of the internal electrode.

The cutout portion K in accordance with a configuration C illustrated in FIG. 14 has a stepped outline formed by two rectangular portions, that is, a first portion Kb1 at the side of the end point k1 and a second portion Kb2 at the side of the end point k2. In the configuration C, the dimensions p1 and p2 in the Y-axis direction and the dimensions q1 and q2 in the X-axis direction of the respective portions Kb1 and Kb2 can be determined as appropriate.

Figure 15A:
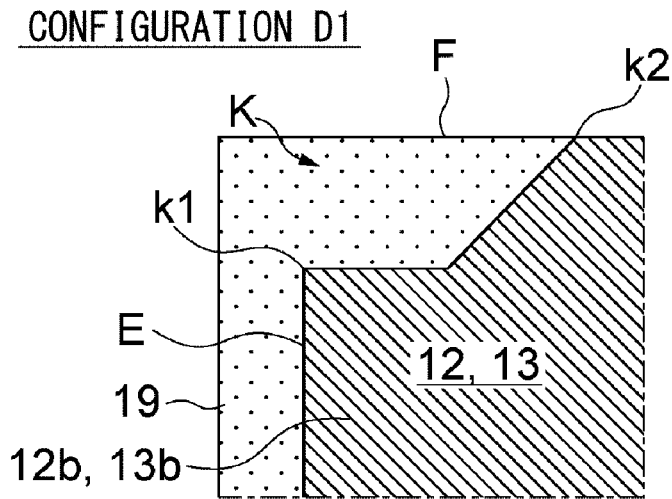
FIG. 15A to FIG. 15C illustrate configurations D1 to D3 of the cutout portion of the internal electrode, respectively.
Figure 15B:
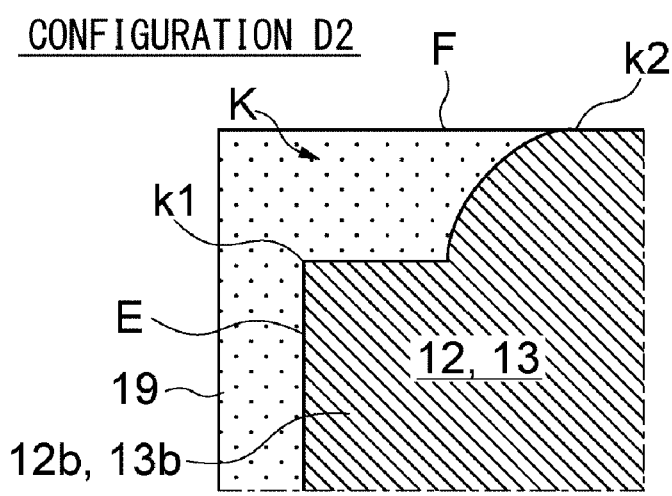
Figure 15C:
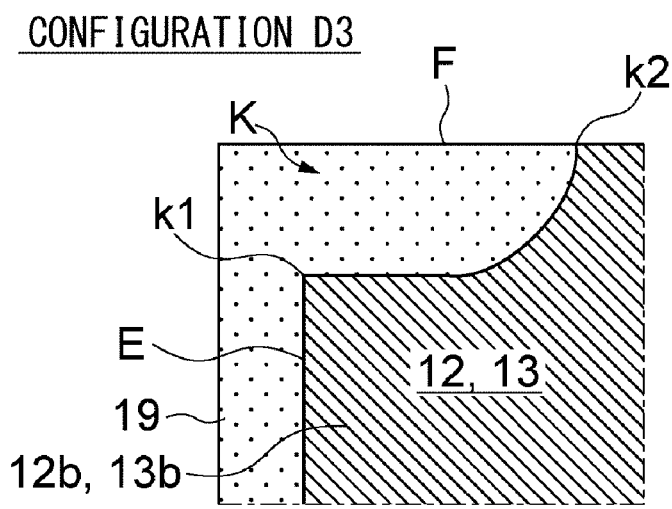

The cutout portions K in accordance with configurations D1 to D3 illustrated in FIG. 15A to FIG. 15C, respectively, differ from the cutout portion K illustrated in FIG. 5 in that the cutout portion K has an outline having a slope in a portion extending in the Y-axis direction at the side of the end point k2. In particular, a linear slope is provided in the configuration D1, a convexly curved slope is provided in the configuration D2, and a concavely curved slope is provided in the configuration D3.

Figure 16A:
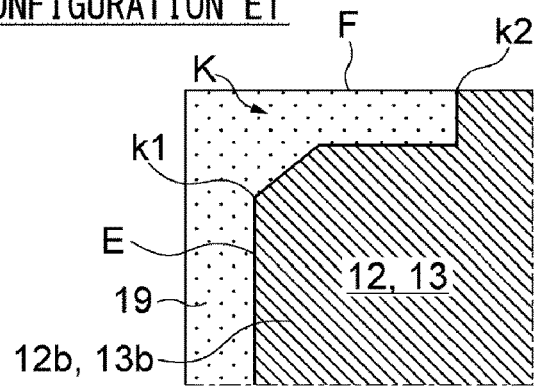
FIG. 16A to FIG. 16D illustrate configurations E1 to E4 of the cutout portion of the internal electrode, respectively.
Figure 16B:
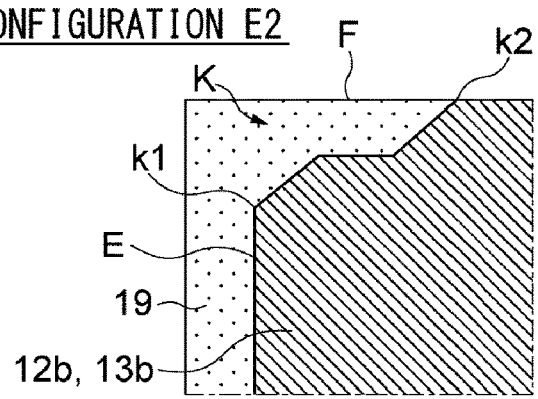
Figure 16C:
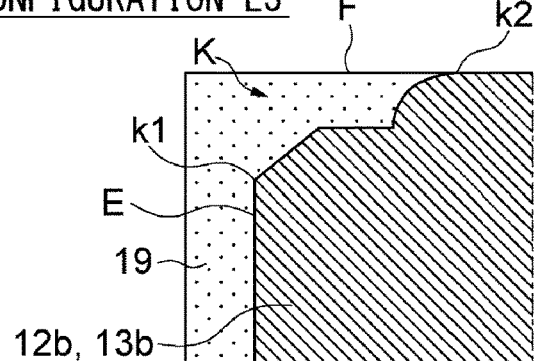
Figure 16D:
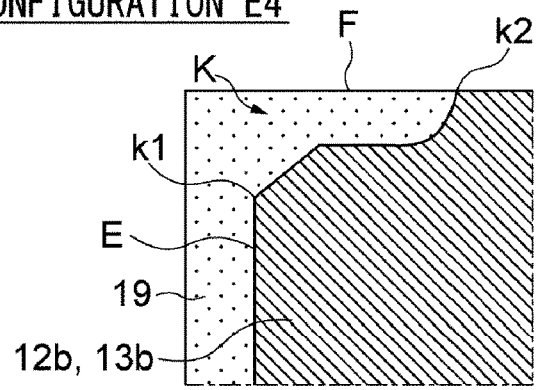

The cutout portion K in accordance with a configuration E1 illustrated in FIG. 16A differs from the cutout portion illustrated in FIG. 5 in that the cutout portion K has an outline having a linear slope in a part at the side of the end point k1 of a portion extending in the X-axis direction. Further, the cutout portions K illustrated in FIG. 16B to FIG. 16D differ from the cutout portion K of the configuration E1 that the cutout portion K has an outline further having another slope in a portion extending in the Y-axis direction at the side of the end point k2. In particular, a linear slope is provided in the configuration E2, a convexly curved slope is provided in the configuration E3, and a concavely curved slope is provided in the configuration E4.

Figure 17A:
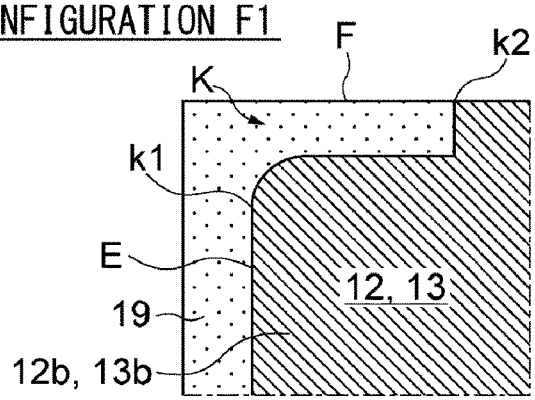
FIG. 17A to FIG. 17D illustrate configurations F1 to F4 of the cutout portion of the internal electrode, respectively.
Figure 17B:
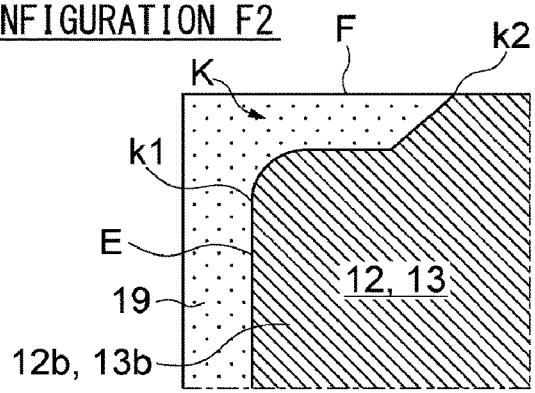
Figure 17C:
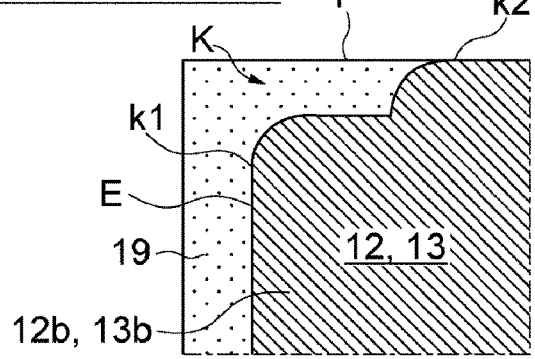
Figure 17D:
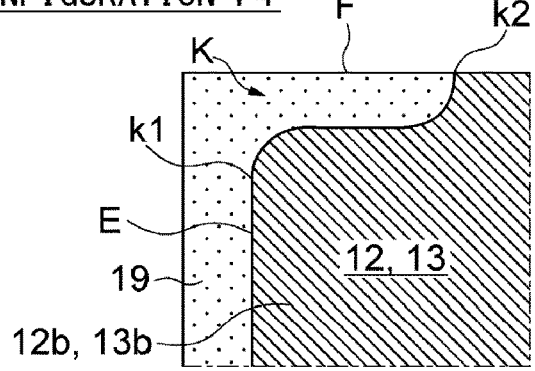

The cutout portion K in accordance with a configuration F1 illustrated in FIG. 17A differs from the cutout portion K illustrated in FIG. 5 in that the cutout portion K has an outline having a convexly curved slope in a part at the side of the end point k1 of a portion extending in the X-axis direction. Further, the cutout portions K illustrated in FIG. 17B to FIG. 17D differ from the cutout portion K of the configuration F1 in that the cutout portion K has an outline further having another slope in a portion extending in the Y-axis direction at the side of the end point k2. In particular, a linear slope is provided in the configuration F2, a convexly curved slope is provided in the configuration F3, and a concavely curved slope is provided in the configuration F4.

Figure 18A:
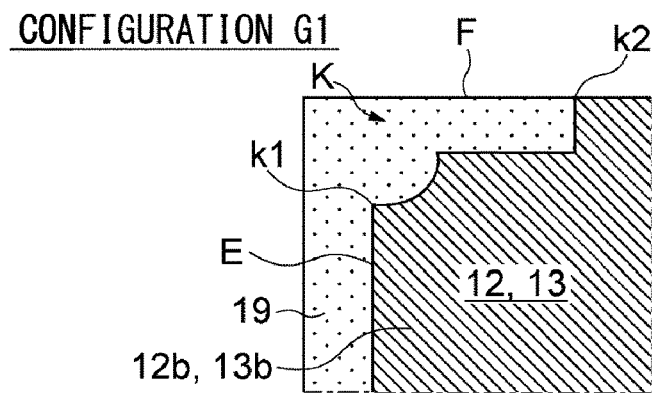
FIG. 18A to FIG. 18D illustrate configurations G1 to G4 of the cutout portion of the internal electrode, respectively.
Figure 18B:
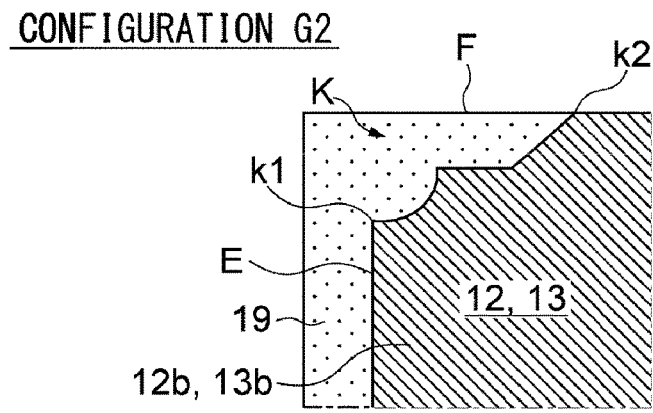
Figure 18C:
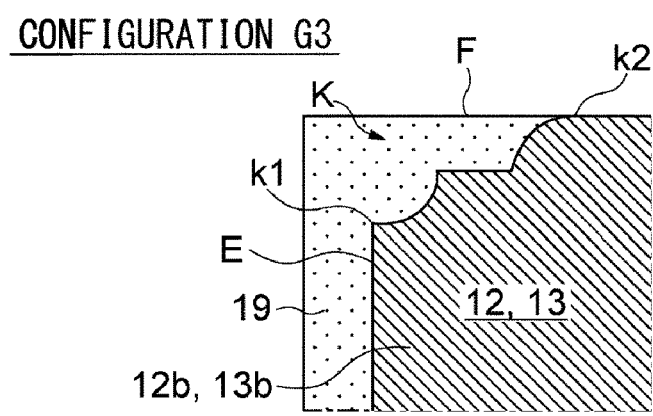
Figure 18D:
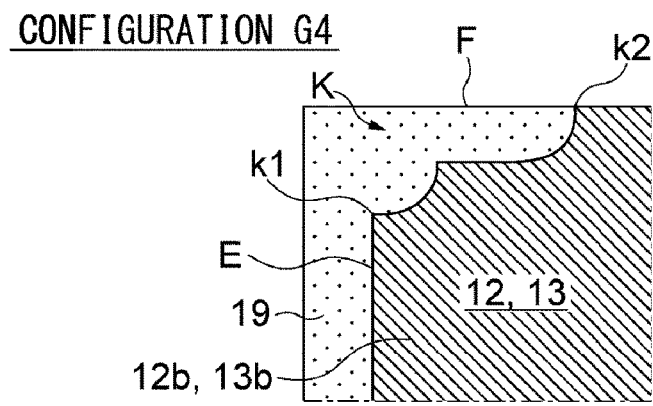
Figure 19:
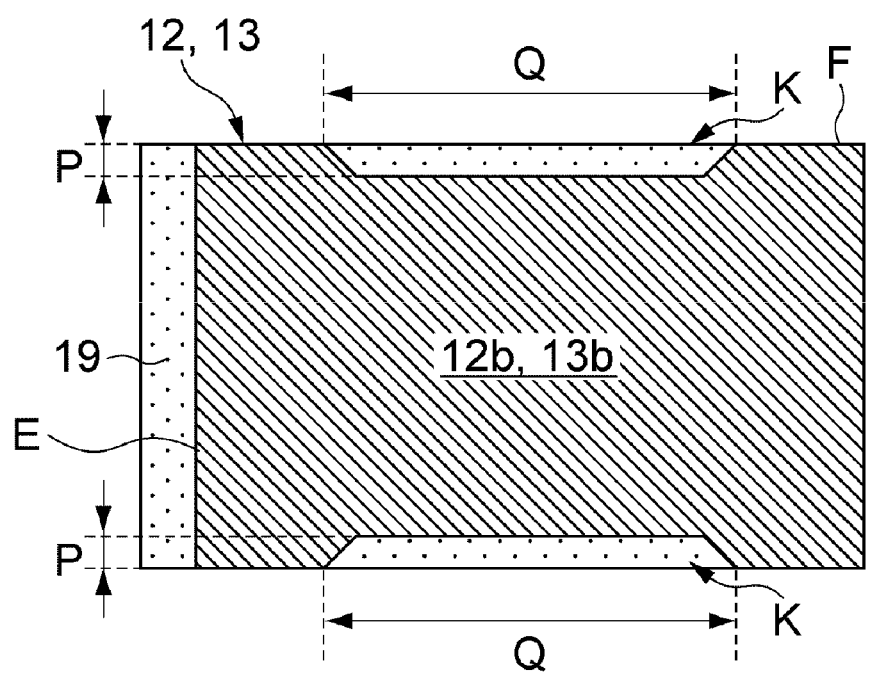
FIG. 19 illustrates a configuration H of the cutout portion of the internal electrode.

The cutout portion K in accordance with a configuration G1 illustrated in FIG. 18A differs from the cutout portion K illustrated in FIG. 5 in that the cutout portion K has an outline having a convexly curved slope in a part at the side of the end point k1 of a portion extending in the X-axis direction. Further, the cutout portions K illustrated in FIG. 18B to FIG. 18D differ from the cutout portion K of the configuration G1 in that the cutout portion K has an outline further having another slope in a portion extending in the Y-axis direction at the side of the end point k2. In particular, a linear slope is provided in the configuration G2, a convexly curved slope is provided in the configuration G3, and a concavely curved slope is provided in the configuration G4.

In the cutout portion K in accordance with any of the above-described configurations, to more effectively inhibit the occurrence of inclination on the covered surface F of the multilayer body 16, the dimension Q in the X-axis direction is preferably larger than the dimension P in the Y-axis direction, that is, the angle α between the straight line connecting the end points k1 and k2 and the covered surface F is preferably less than 45°.

The narrow-width portions 12*b* and 13*b* are only required to be provided in portions other than the lead-out portions 12*a* and 13*a* of the internal electrodes 12 and 13 and do not necessarily have to be provided in the end portions at the side of the sides E of the internal electrodes 12 and 13. For example, as in a configuration H illustrated in FIG. 19, the cutout portion K may be provided in the central portion in the X-axis direction, and the narrow-width portions 12*b* and 13*b* that are recessed may be formed in the central portion in the X-axis direction. The internal electrodes 12 and 13 provided with the cutout portions K in accordance with the configuration H are separately exposed at two locations on each covered surface F, but the total dimension in the X-axis direction of the portions exposed to each covered surface F is reduced, and thus the same advantages as described above are achieved. In the cutout portion K in accordance with the configuration H, the dimension P in the Y-axis direction and the dimension Q in the X-axis direction can be determined as appropriate.

Figure 13B:
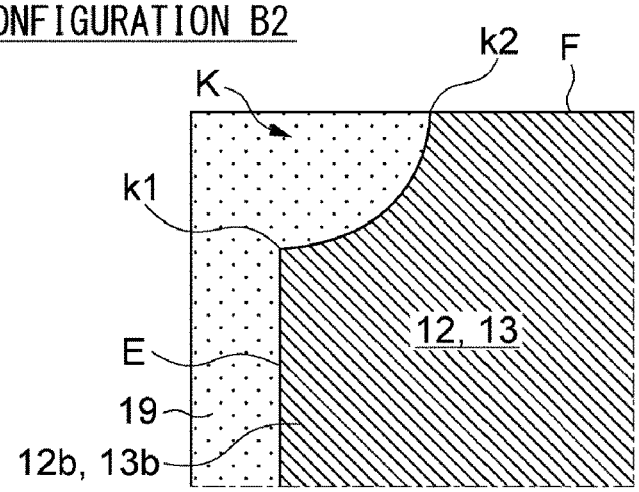
Figure 13C:
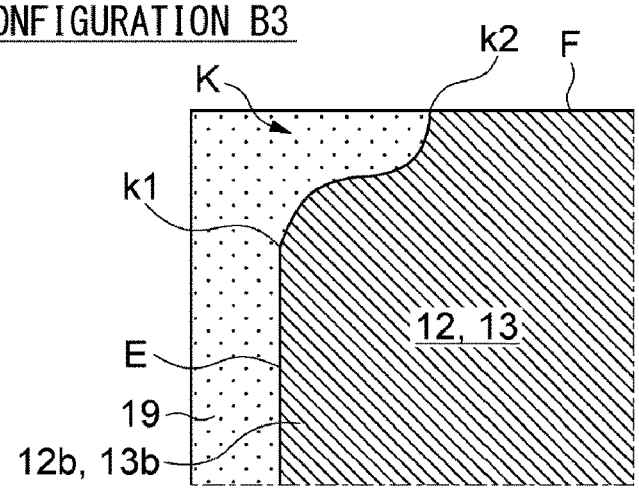

To make it difficult for the cutting edge of the cutting blade to shift in the Y-axis direction and to more effectively inhibit the occurrence of inclination on the covered surface F of the multilayer body 16, the outline of the cutout portion K of each of the internal electrodes 12 and 13 preferably includes displacement components in both the X-axis direction and the Y-axis direction, that is, includes a portion inclined with respect to the X-axis and the Y-axis as illustrated in, for example, FIG. 13A to FIG. 13C, rather than only a portion extending along the X-axis direction and a portion extending along the Y-axis direction as illustrated in FIG. 4. That is, the outline of the recess portion R of each of the conductor patterns 112 and 113 provided on the respective ceramic sheets 101 and 102 in step S01 has both the displacement component in the X-axis direction and the displacement component in the Y-axis direction, that is, includes a portion inclined with respect to the X-axis and the Y-axis. Further, from the same viewpoint, the outline of the cutout portion K more preferably includes a portion in which the displacement component in the X-axis direction is larger than the displacement component in the Y-axis direction, such as the end portion closer to the end point k2 in FIG. 13A, the end portion closer to the end point k1 in FIG. 13B, or the central portion in FIG. 13C. That is, the outline of the recess portion R of each of the conductor patterns 112 and 113 provided on the respective ceramic sheets 101 and 102 in step S01 more preferably includes a portion in which the displacement component in the X-axis direction is larger than the displacement component in the Y-axis direction.

EXAMPLES

As examples of the above embodiment, samples of the multilayer ceramic capacitor 10 were fabricated in which only the configurations of the cutout portions K of the internal electrodes 12 and 13 were different. For each configuration, 1000 samples were subjected to a sampling inspection, samples in which the angle of the covered surface F of the multilayer body 16 with respect to the Z-axis exceeded 2.5° were determined to be defective, and a defect rate, which is a ratio of defective samples, was obtained.

In addition, as a comparative example of the above-described embodiment, samples of a multilayer ceramic capacitor that is different from the above-described example only in a configuration in which no cutout portion K is provided in the internal electrodes 12 and 13 were prepared. In the configuration according to the comparative example, a sampling inspection was performed on 1000 samples in the same manner as described above, and the defect rate was 2.2%.

Tables 1 to 3 present the type of the configuration described above, the dimension P in the Y-axis direction, the dimension Q in the X-axis direction, and the ratio Q/P of the dimension Q to the dimension P for the cutout portion K. In Tables 1 to 3, the defect rates obtained for the respective configurations are also presented. The configuration A0 in Table 1 indicates the configuration of the cutout portion K illustrated in FIG. 5.

Further, in the cutout portion K of the configuration C presented in Table 2, the dimension p1 in the X-axis direction of the first portion Kb1 was 30 μm, the dimension q1 in the Y-axis direction of the first portion Kb1 was 40 μm, the dimension q1 in the X-axis direction of the second portion Kb2 was 30 μm, and the dimension q2 in the X-axis direction of the second portion Kb2 was 60 μm. In the column corresponding to the configuration C in Table 2, the dimension P is presented as the sum of the dimensions p1 and p2, and the dimension Q is presented as the sum of the dimensions q1 and q2.

TABLE 1

| Configuration | P (μm) | Q (μm) | Q/P | Defect rate (%) |
|---|---|---|---|---|
| A0 | 30 | 10 | 0.3 | 2.1 |
| A0 | 40 | 20 | 0.5 | 2 |
| A0 | 100 | 40 | 0.4 | 1.9 |
| A0 | 10 | 100 | 10.0 | 0.3 |
| A0 | 30 | 40 | 1.3 | 0.6 |
| A0 | 30 | 50 | 1.7 | 0.6 |
| A0 | 30 | 100 | 3.3 | 0.4 |
| A0 | 30 | 70 | 2.3 | 0.5 |
| A0 | 40 | 40 | 1.0 | 1.4 |
| A0 | 40 | 100 | 2.5 | 0.7 |

TABLE 1-continued

| Configuration | P (μm) | Q (μm) | Q/P | Defect rate (%) |
|---|---|---|---|---|
| A0 | 40 | 320 | 8.0 | 0.2 |
| A0 | 40 | 460 | 11.5 | 0.1 |
| A0 | 50 | 100 | 2.0 | 0.4 |
| A1 | 100 | 40 | 0.4 | 1.7 |
| A1 | 40 | 20 | 0.5 | 1.7 |
| A1 | 40 | 40 | 1.0 | 0.9 |
| A1 | 40 | 140 | 3.5 | 0.5 |
| A1 | 40 | 320 | 8.0 | 0.1 |
| A1 | 40 | 460 | 11.5 | 0 |

TABLE 2

| Configuration | P (μm) | Q (μm) | Q/P | Defect rate (%) |
|---|---|---|---|---|
| B1 | 100 | 40 | 0.4 | 1.7 |
| B1 | 40 | 20 | 0.5 | 1.8 |
| B1 | 40 | 40 | 1.0 | 0.9 |
| B1 | 40 | 140 | 3.5 | 0.6 |
| B1 | 40 | 320 | 8.0 | 0.2 |
| B1 | 40 | 460 | 11.5 | 0 |
| B2 | 100 | 40 | 0.4 | 1.9 |
| B2 | 40 | 20 | 0.5 | 2 |
| B2 | 40 | 40 | 1.0 | 1.1 |
| B2 | 40 | 140 | 3.5 | 0.6 |
| B2 | 40 | 320 | 8.0 | 0.1 |
| B2 | 40 | 460 | 11.5 | 0 |
| B2 | 40 | 460 | 11.5 | 0 |
| C | 60 | 100 | 1.7 | 0.3 |

TABLE 3

| Configuration | P (μm) | Q (μm) | Q/P | Defect rate (%) |
|---|---|---|---|---|
| D1 | 40 | 140 | 3.5 | 0.5 |
| D2 | 40 | 140 | 3.5 | 0.5 |
| D3 | 40 | 140 | 3.5 | 0.4 |
| E1 | 40 | 140 | 3.5 | 0.5 |
| E2 | 40 | 140 | 3.5 | 0.3 |
| E3 | 40 | 140 | 3.5 | 0.4 |
| E4 | 40 | 140 | 3.5 | 0.4 |
| F1 | 40 | 140 | 3.5 | 0.5 |
| F2 | 40 | 140 | 3.5 | 0.3 |
| F3 | 40 | 140 | 3.5 | 0.4 |
| F4 | 40 | 140 | 3.5 | 0.4 |
| G1 | 40 | 140 | 3.5 | 0.5 |
| G2 | 40 | 140 | 3.5 | 0.3 |
| G3 | 40 | 140 | 3.5 | 0.5 |
| G4 | 40 | 140 | 3.5 | 0.4 |
| H | 40 | 200 | 5.0 | 0.3 |

As presented in Tables 1 to 3, in all the configurations of the examples in which the cutout portions K were provided in the internal electrodes 12 and 13, the defect rate was lower than that in the configuration of the comparative example in which no cutout portions K were provided in the internal electrodes 12 and 13. In addition, in any of the configurations in which the ratio Q/P was less than 1, the defect rate was reduced to a very low value of less than 1%.

Other Embodiments

Although the embodiments of the present invention have been described above, the present invention is not limited to the above-described embodiments, and can be modified in various ways.

For example, in the narrow-width portions 12*b* and 13*b* of the respective internal electrodes 12 and 13, the configurations of the pair of the cutout portions K may be different from each other. In addition, in the narrow-width portions 12*b* and 13*b* of the respective internal electrodes 12 and 13, the configuration in which the cutout portions K are provided on both sides of the pair of the covered surfaces F is not essential, and the cutout portion K may be provided on only one side of the pair of the covered surfaces F.

What is claimed is:

1. A multilayer ceramic capacitor comprising:
   a ceramic body including a multilayer body and a pair of side margin portions, the multilayer body including a plurality of ceramic layers stacked in a direction of a first axis, a plurality of internal electrodes interposed between the plurality of ceramic layers, a pair of end surfaces perpendicular to a second axis orthogonal to the first axis, and a pair of side surfaces perpendicular to a third axis orthogonal to the first axis and the second axis, the pair of side margin portions covering the pair of side surfaces, the internal electrodes being absent in the side margin portions; and
   a pair of external electrodes covering the pair of end surfaces, respectively,
   wherein each of the plurality of internal electrodes includes a lead-out portion led out to either one of the pair of end surfaces of the multilayer body and a single narrow-width portion having a width in a direction of the third axis smaller than that of the lead-out portion, each of the internal electrodes having a same width in the direction of the third axis except the narrow-width portion, and
   wherein the multilayer body and the side margin portions are formed separately and are attached to each other thereafter so that positions of outermost end portions of internal electrodes in the direction of the third axis are substantially aligned with each other at interfaces between the multilayer body and the side margin portions such that among any of the two adjacent internal electrodes and at any cross section orthogonal to the second axis, a rate at which the positions in the direction of the third axis of the outermost end portions of the two internal electrodes adjacent to each other in the direction of the first axis in the cross section orthogonal to the second axis are found to be aligned within a range of 1.0 μm or less in the direction of the third axis is 50% or greater,
   wherein each of the plurality of internal electrodes includes cutout portions that form outlines that are recessed inward in the direction of the third axis from the pair of side surfaces, respectively, in the narrow-width portion, and
   wherein in each of the cutout portions of each of the plurality of internal electrodes, a ratio of a dimension of the cutout portion in a direction of the second axis to a dimension of the cutout portion in the direction of the third axis is equal to or greater than 3.5.

2. The multilayer ceramic capacitor according to claim 1, wherein in each of the plurality of internal electrodes, the narrow-width portion is provided at an end portion opposite to the lead-out portion in a direction of the second axis.

3. The multilayer ceramic capacitor according to claim 1, wherein in each of the plurality of internal electrodes, the narrow-width portion is provided at a central portion in a direction of the second axis.

4. The multilayer ceramic capacitor according to claim 1, wherein the number of the plurality of internal electrodes that are stacked is 50 or greater.

5. The multilayer ceramic capacitor according to claim 1, wherein a dimension of the ceramic body in the direction of the first axis is larger than a dimension of the ceramic body in the direction of the third axis.

\* \* \* \* \*